United States Patent
Rhyu et al.

(10) Patent No.: US 12,113,835 B2
(45) Date of Patent: Oct. 8, 2024

(54) METHOD AND DEVICE FOR PROVIDING AR SERVICE IN COMMUNICATION SYSTEM

(71) Applicant: SAMSUNG ELECTRONICS CO., LTD., Suwon-si (KR)

(72) Inventors: Sungryeul Rhyu, Suwon-si (KR); Jaeyeon Song, Suwon-si (KR); Hyunkoo Yang, Suwon-si (KR); Hakju Lee, Suwon-si (KR); Eric Yip, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 55 days.

(21) Appl. No.: 17/662,548

(22) Filed: May 9, 2022

(65) Prior Publication Data
US 2022/0368731 A1     Nov. 17, 2022

(30) Foreign Application Priority Data
May 11, 2021   (KR) ...................... 10-2021-0061038

(51) Int. Cl.
*H04L 65/1069* (2022.01)
*H04L 67/131* (2022.01)

(52) U.S. Cl.
CPC ........ *H04L 65/1069* (2013.01); *H04L 67/131* (2022.05)

(58) Field of Classification Search
CPC ........................... H04L 67/131; H04L 65/1069
See application file for complete search history.

(56) References Cited

U.S. PATENT DOCUMENTS

| | | | | |
|---|---|---|---|---|
| 2015/0235267 A1* | 8/2015 | Steube | ................... | G06V 20/20 705/14.58 |
| 2016/0133230 A1* | 5/2016 | Daniels | ................... | G06F 3/147 345/633 |

(Continued)

FOREIGN PATENT DOCUMENTS

| KR | 10-2021-0010083 A | 1/2021 |
|---|---|---|
| KR | 10-2021-0036212 A | 4/2021 |

OTHER PUBLICATIONS

International Search Report dated Aug. 5, 2022 in connection with International Patent Application No. PCT/KR2022/006517, 3 pages.
(Continued)

*Primary Examiner* — Joe Chacko

(57) ABSTRACT

The disclosure relates to a 5G or 6G communication system for supporting a higher data transmission rate. The disclosure relates to a method and device for providing an augmented reality (AR) service in a communication system. According to an embodiment of the disclosure, a method performed by a user equipment (UE) includes generating ambient environment information including at least one piece of information obtained based on an ambient environment of the UE; establishing a session for receiving an AR service description from an application server; receiving, from the application server, the AR service description including pipeline information indicating a transmission path related to the AR service and result information about at least one process requested by the UE; and transmitting the ambient environment information to the application server and receiving at least one media segment of an AR content from the application server based on the ambient environment information.

20 Claims, 14 Drawing Sheets

(56) References Cited

U.S. PATENT DOCUMENTS

| | | | |
|---|---|---|---|
| 2018/0089870 A1* | 3/2018 | Billi-Duran | G06Q 10/20 |
| 2019/0104326 A1* | 4/2019 | Stockhammer | H04N 21/816 |
| 2019/0200063 A1 | 6/2019 | Bae et al. | |
| 2020/0368616 A1* | 11/2020 | Delamont | A63F 13/213 |
| 2021/0127147 A1 | 4/2021 | Shin | |
| 2021/0166473 A1* | 6/2021 | Smith | H04W 4/021 |

OTHER PUBLICATIONS

Written Opinion of the International Searching Authority dated Aug. 5, 2022 in connection with International Patent Application No. PCT/KR2022/006517, 4 pages.

* cited by examiner

METHOD AND DEVICE FOR PROVIDING AR SERVICE IN COMMUNICATION SYSTEM

CROSS-REFERENCE TO RELATED APPLICATION

This application is based on and claims priority under 35 U.S.C. § 119 to Korean Patent Application No. 10-2021-0061038, filed on May 11, 2021, in the Korean Intellectual Property Office, the disclosure of which is herein incorporated by reference in its entirety.

BACKGROUND

1. Field

The disclosure relates to a method and device for providing an augmented reality (AR) service in a communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Meanwhile, conventional methods for providing media content on over-the-top (OTT, e.g., an online streaming service, such as Netflix) have media segments with different resolutions and bitrates considering user equipment (UE) and transmission environments and provide an entry point file (e.g., multimedia presentation description (MPD)), which indicates the uniform resource locator (URL) of the media segments and conditions, e.g., resolution, to UEs.

FIG. 1 is a view illustrating a method for providing dynamic adaptive streaming over hypertext transfer protocol (HTTP) (DASH) streaming from 3rd generation partnership project (3GPP) 5GMS (MS: media streaming).

Referring to FIG. 1, in operation 101, the 5GMS application provider provides a content list to the 5GMS service aware application to allow the 5GMS service aware application to select content. In operation 102, the 5GMS aware application selects the content to play. In operation 103, the 5GMS aware application instructs the media session handler (MSH) to control the playback of the selected content and, in operation 104, the MSH requests service access information from the application function (AF) as necessary. Thereafter, in operation 105, the 5GMS aware application instructs the media player to play the selected content and, in operation 106, the media play communicates with the application server (AS) to establish a session.

If a session is established, the media play requests the above-described MPD from the AS in operation 107 and, in operation 108, the media play completes reception of the MPD. In operation 109, the media player processes the received MPD and, in operation 110, the media player notifies the MSH of reception of the MPD. If necessary, in operation 111, the media player obtains a license for decoding the digital rights management (DRM) from the 5GMS application provider and, in operation 112, the media player configures a playback pipeline for receiving media segments for playback. In operation 113, the media player establishes a transmission session between media player and AS according to the playback pipeline configuration.

In operation 114, the media player notifies the MSH of, e.g., the session parameter. In operation 115, the media player requests initialization information containing media initialization information from the AS and, in operation 216, receives the initialization information. In operation 117, the media player requests media segments from the AS and, in operation 118, receives media segments of content. After operation 119, the media player repeats the operations of requesting and receiving media segments from the AS.

SUMMARY

The disclosure provides a method and device for providing an AR service based on an ambient environment of a user equipment (UE) in a communication system.

The disclosure provides a method and device for providing an AR service based on the position of a UE in an ambient environment of the UE in a communication system.

The disclosure provides a method and device for providing an AR service using an AR service description (ASD) generated based on an ambient environment of a UE in a communication system.

According to an embodiment of the disclosure, a method performed by a user equipment (UE) in a communication system configured to provide an AR service may include generating ambient environment information including at least one piece of information obtained based on an ambient environment of the UE; establishing a session for receiving an AR service description from an application server; receiving, from the application server, the AR service description including pipeline information indicating a transmission path related to the AR service and result information about at least one process requested by the UE; and transmitting the ambient environment information to the application server and receiving at least one media segment of an AR content from the application server based on the ambient environment information.

Further, according to an embodiment of the disclosure, a UE in a communication system configured to provide an AR service may include a transceiver; a memory configured to store information related to the AR service; and at least one processor configured to generate ambient environment information including at least one piece of information obtained based on an ambient environment of the UE, establish a session for receiving an AR service description from an application server, receive, from the application server through the transceiver, the AR service description including pipeline information indicating a transmission path related to the AR service and result information about at least one process requested by the UE, and transmit the ambient environment information to the application server through the transceiver and receive at least one media segment of an AR content from the application server through the transceiver based on the ambient environment information.

Further, according to an embodiment of the disclosure, a method performed by an application server in a communication system configured to provide an AR service may include establishing a session for providing a UE with an ASD; transmitting, to the UE, the AR service description including pipeline information indicating a transmission path related to the AR service and result information about at least one process requested by the UE; and receiving the ambient environment information from the UE and transmitting at least one media segment of an AR content to the UE based on the ambient environment information.

Further, according to an embodiment of the disclosure, an application server in a communication system configured to provide an AR service may include a transceiver; a memory configured to store information related to the AR service; and at least one processor configured to establish a session for providing a UE with an ASD, transmit, to the UE through the transceiver, the AR service description including pipeline information indicating a transmission path related to the AR service and result information about at least one process requested by the UE and receive the ambient environment information from the UE through the transceiver and transmit at least one media segment of an AR content to the UE through the transceiver based on the ambient environment information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
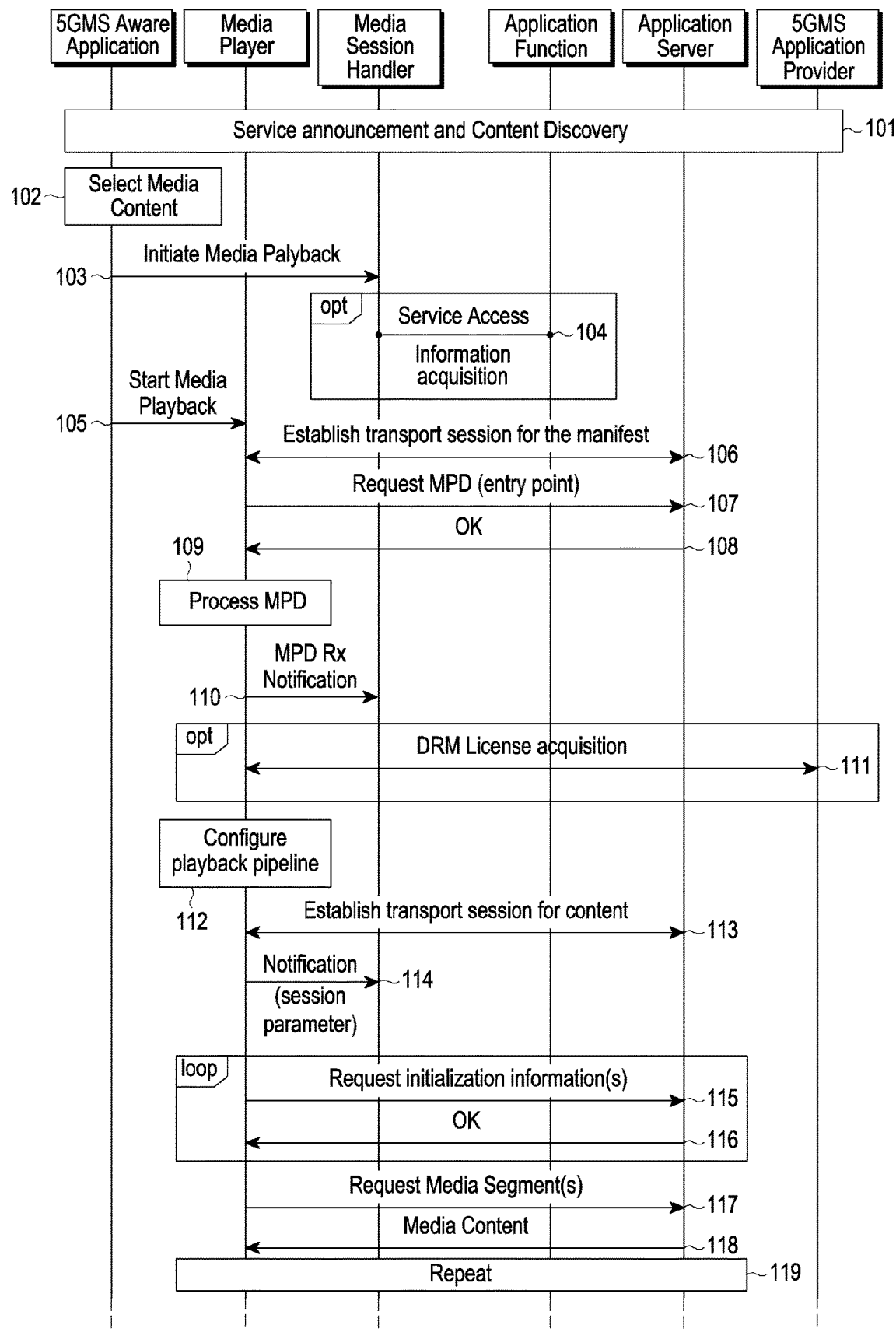
FIG. 1 is a view illustrating a method for providing DASH streaming in a 3GPP 5GMS.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings.

In describing the embodiments of the disclosure, the description of technologies that are known in the art and are not directly related to the present disclosure is omitted. This is for further clarifying the gist of the present disclosure without making it unclear.

For the same reasons, some elements may be exaggerated or schematically shown. The size of each element does not necessarily to reflect the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term " . . . unit" means a software element or a hardware element. The " . . . unit" plays a certain role. However, the term "unit" is not limited as meaning a software or hardware element. A "unit" may be configured in a storage medium that may be addressed or may be configured to reproduce one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a "unit" may be combined with additional elements or may be split into sub elements or sub-units. Further, an element or a "unit" may be implemented to reproduce one or more CPUs in a device or a security multimedia card. According to embodiments, a " . . . unit" may include one or more processors.

In the disclosure, the terminal may include UE (user equipment), MS (mobile station), cellular phone, smartphone, computer, or multimedia system capable of performing communication functions. The embodiments of the present disclosure may also apply to other communication systems with similar technical background or channel form. Further, embodiments of the present disclosure may be modified in such a range as not to significantly depart from the scope of the present disclosure under the determination by one of ordinary skill in the art and such modifications may be applicable to other communication systems.

As used herein, terms for identifying access nodes, terms denoting access nodes/network entities or network functions (NFs), terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

In a specific description of the disclosure, a communication system may use various wired or wireless communication systems, e.g., the new RAN (NR), which is the radio access network, and the packet core (5G system, or 5G core network, or next generation core (NG core)), which is the core network, according to the 5G communication standard of the 3GPP which is a radio communication standardization organization. Embodiments of the present disclosure may also be applicable to communication systems with a similar technical background with minor changes without significantly departing from the scope of the present disclosure, and this may be possible under the determination of those skilled in the art to which the present disclosure pertains.

Further, as used herein, the terms indicating network entities, messages, and information transmitted/received between network entities are provided as an example for convenience of description. Thus, the disclosure is not limited by the terms, and such terms may be replaced with other terms denoting objects with equivalent technical concept.

Conventional media services own different versions for pre-made videos, e.g., multiple versions of videos that have different resolutions, frames-per-second, and compression rates to be consumable most appropriately to fit for UEs and the transmission environment of the UEs, have a portion of each version of video as a media segment, and provide the address of the media segment in a manifest file to allow the UE to receive the manifest file and then select and receive the optimal media version and media segment.

The AR media service provided herein provides a method and device for two-dimensional (2D) rendering of three-dimensional (3D) AR content considering the user's ambient environment and the user's position in the ambient environment and transmitting the result of the rendering. To that end, in the disclosure, the UE obtains information for the UE's ambient environment (hereinafter, "ambient environment information") to receive content from a server (e.g., an application server (AS)) and transmits the obtained ambient environment information to the server. Thereafter, the server prepares for content based on the ambient environment information obtained from the UE and transmits content to the UE. Description information about the AR service, which describes the information, may be exchanged between the UE and the server. All or some of the above-described operations may be performed according to the configuration of the AR service.

According to an embodiment, described below are ambient environment information about the UE, which is transmitted by the UE to receive the AR service, for the AR service to provide 3D AR content to the UE, a method for transmitting the ambient environment information, a server process and results of operations considering the ambient environment information, a method for transmitting the server results, and an AR service providing method using the AR service description that has the information and transmission information as components.

Specifically, in the following descriptions, described are an AR service description method that include, as components, the ambient environment (surroundings) of the user (UE), 2D information (e.g., captured images) or 3D information (e.g., geometry) that represents the ambient environment of the user (UE), the spatial position (user/UE position) and viewport of the user (UE) in the ambient environment of the user (UE), the position and viewport of the user (UE) shown as information positioned on the geometry, virtual 3D AR content positioned on the geometry, configuration of a pipeline representing the transmission path of all the information and establishment of a transmission session, processes considering some or all information, e.g., 2D rendering process of 3D AR content, results of the processes, configuration of a transmission pipeline of the rendering results and establishment of a transmission session, and transmission of the results of all or some processes, and a specific configuration therefor.

Figure 2A:
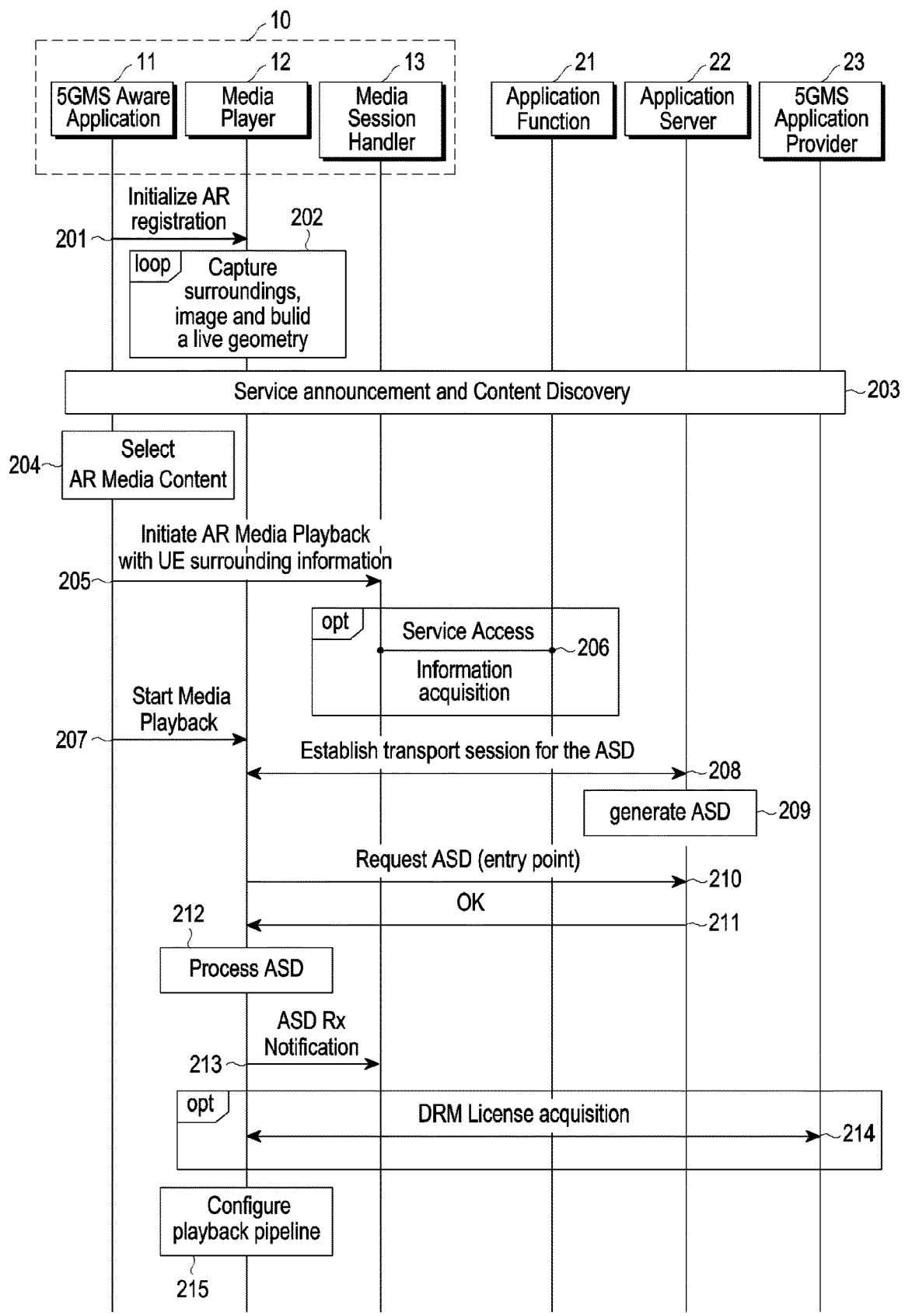
FIGS. 2A and 2B are views illustrating a method for providing an AR service in a communication system according to an embodiment of the present disclosure.
Figure 2B:
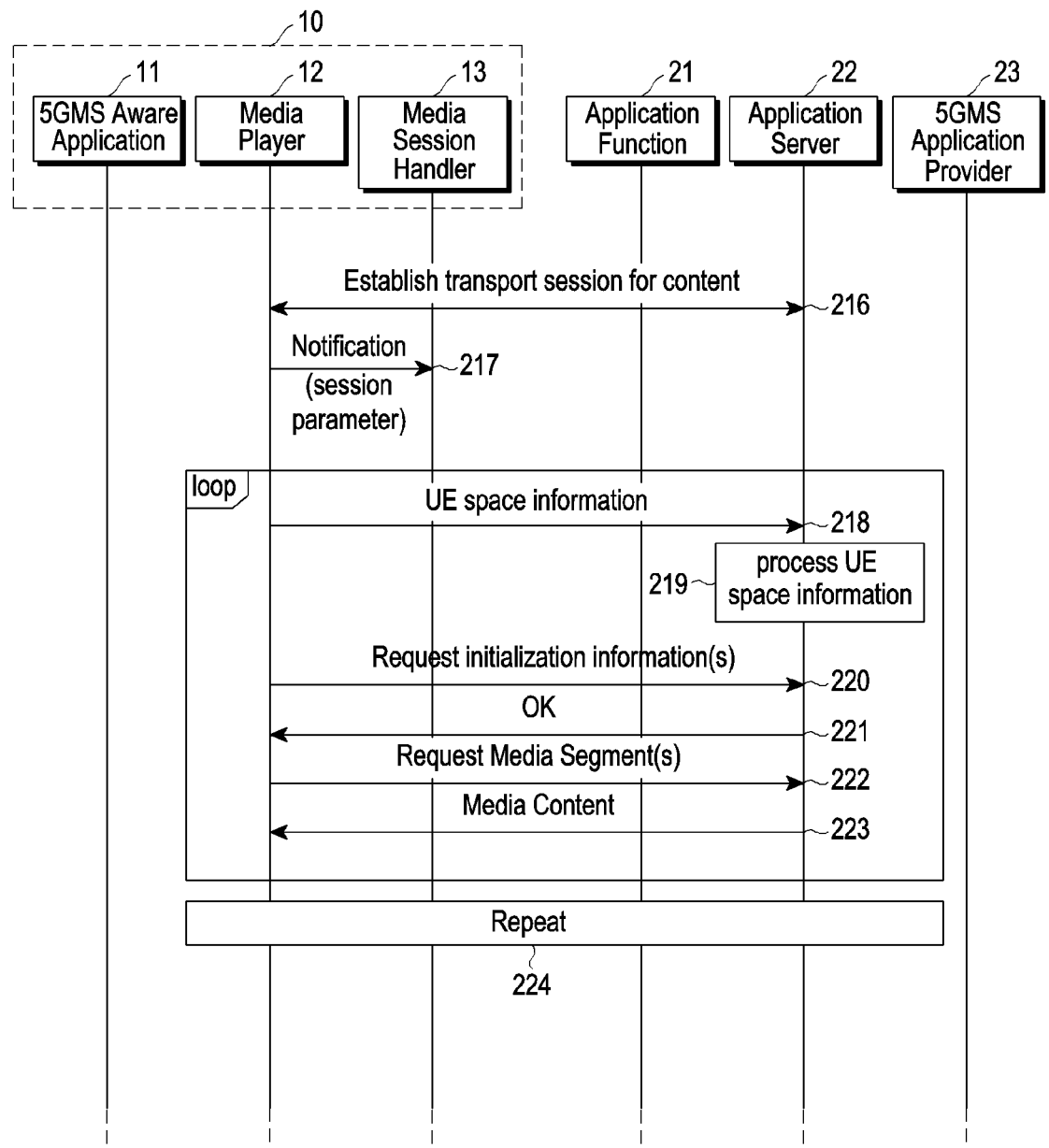

FIGS. 2A and 2B are views illustrating a method for providing an AR service in a communication system according to an embodiment of the present disclosure.

Referring to FIGS. 2A and 2B, a UE 10 includes a 5GMS aware application 11, a media player 12, and a media session handler (MSH) 13. The UE 10 communicates with an application function (AF) 21, an application server (AS) 22, and a 5GMS application provider 23 in the communication system, receiving an AR service.

According to the disclosure, the UE receiving the AR service may drive the 5GMS aware application 11 which may recognize and use the 5GMS architecture as conventional, drive the media player, which may receive and play AR content, and drive the MSH 13, which involves transmission quality and session establishment.

According to the disclosure, to receive the AR service, the UE 10 may be required to notify the AS 22 of the ambient environment information about the UE 10. If the ambient environment information about the UE 10 is provided to the AS 22, it is possible to provide more realistic AR content considering the ambient environment, which is to be viewed by the user through the display of the UE 10, and the position/angle/distance/light of the content combined with the ambient environment.

When the ambient environment information about the UE 10 is transmitted, the construction of the ambient environment information may be performed before operation 203 or operation 205 to be described with reference to FIG. 2A. In other words, before AR contents are listed or playback of at least one AR content starts, ambient environment information may be constructed and, based thereupon, the AS 22 is enabled to determine: 1) that the ambient environment information is scheduled to be provided; and 2) what ambient environment information is to be provided. For example, the construction of the ambient environment information on the UE 10 may be performed in operations 201 and 202 of FIG. 2. The 5GMS aware application 11 of the UE 10 may communicate with the 5GMS application provider 23 over the network to notify that the ambient environment information is to be provided and what ambient environment information is to be provided. The 5GMS aware application 11 may be simply referred to as an aware application, and the 5GMS application provider 23 may be referred to as an application provider.

In operation 201 of FIG. 2A, the 5GMS aware application 11 of the UE 10 instructs the media player 12 to prepare for AR registration.

Here, AR registration may include obtaining information indicating the ambient environment (surroundings) of the UE 10, shaping/constructing a virtual 3D space (e.g., live geometry) based on the obtained information and then continuously (or periodically) mapping and updating the ambient environment and the virtual 3D space, and mapping the position and gaze direction of the UE 10 to the 3D space. By the AR registration, the ambient environment information may include at least one of information about the virtual 3D space, mapping information with the reality, and position and direction information about the UE.

In operation 202, the media player 12 may construct a virtual 3D space for the ambient environment of the UE 10 based on information obtained by, e.g., the 2D camera, 3D camera, infrared camera, time-of-flight (ToF) sensor for measuring distance, geomagnetic sensor, gyro sensor, user interaction or other position, direction, acceleration, and/or distance measuring sensors attached to the UE 10. According to the capability of the UE 10, the virtual 3D space may be generated by the UE 10 or a server including the AS 22. In the latter case, the ambient environment information including the camera image information and/or sensor information obtained by the UE 10 may be transmitted to the server including the AS 22. The ambient environment information provided from the UE 10 to the server including the AS 22 may include at least one of the information about the virtual 3D space, mapping information with reality, and position and direction information about the UE 10 or may include camera image information and/or sensor information necessary to generate the information about the virtual 3D space.

In operation 203, the 5GMS aware application 11 of the UE 10 and the 5GMS application provider 23 over the network perform service information transmission/reception and AR content search for performing an AR content service.

In operation 204, the 5GMS aware application 11 selects at least one AR content according to the user's input.

In operation 205, the 5GMS aware application 11 instructs the MSH 13 to control the playback of the AR media content. In this case, type information of the ambient environment information about the UE 10 obtained and generated from the media player 12 is provided from the 5GMS aware application 11 to the MSH 13. The provided information may include at least one of information about whether the UE 10 is able to generate live geometry, information about whether live geometry is to be provided, type information, e.g., camera/sensor, information about whether the obtained information is to be provided, and the type of the process that the server including the AS 22 is requested to perform. Whether to generate live geometry may be determined as possible or no. Whether to provide live geometry may be determined as possible or no.

The type information, e.g., camera/sensor, may include at least one of identification information about various types, such as the above-described 2D, 3D, infrared, ToF, geomagnetic, gyro, or user interaction, and/or detailed attribute information about each type. Whether each obtained piece of information may be provided may be determined as possible or no. The requested process may be all or at least one of a rendering process for rendering 3D AR media content into 2D media, a tailoring process for partial delivery of all or only part of the 3D AR media content, a vision engine process for constructing live geometry from the received camera and sensor information, or a semantic engine process for grasping a meaning (e.g., human, car, or building) from the received camera and sensor information.

In operation 206, the MSH 13 of the UE 10 may report a process request for the AS 22 and ambient environment information about the UE 10 in communication with the AF 21 over the network. The service access information received from the AF 21 may include at least one of whether the requested process is available, an indication of the information required by the process of the AS 22 among the ambient environment information available on the UE 10, a method for transmitting the corresponding information, and a method for transmitting the result of the process of the AS 22. The service access information may include the AR service description (ASD) or address information through which the UE 10 may receive the ASD. Operation 206 may be optionally performed. Although the embodiment of FIG. 2A exemplifies that the UE 10 receives the ASD from the AS 22, it is alternatively possible to receive the ASD from the AF 21. In this case, operations 207 to 211 described below may be omitted.

In operation 207, the 5GMS aware application 11 instructs the media player 12 to play the AR media.

In operation 208, the media player 12 establishes a transmission session for receiving the ASD from the AS 22.

In operation 209, the AS 22 may generate the ASD depending on the context of the UE 10. Generation of the ASD may be performed at any point in time after the service access information is generated in operation 206, after the ASD transmission session is established in operation 208, or before the media player 12 requests to transmit the ASD in operation 210.

The ASD may include, as component(s), one or more of information transmitted by the tUE10 for the UE 10 to receive the AR service, the method for transmitting information about the UE 10, the server process of the AS 22 considering the ambient environment information about the UE 10 and operation result information, and the method for transmitting the server results.

The media player 12 requests the ASD from the AS in operation 210, receives the ASD from the AS 22 in operation 211, identifies and processes the received ASD in operation 212, and notifies the MSH 13 of successful reception of the ASD in operation 213.

In operation 214, the media player 12 may receive DRM information from the 5GMS application provider 23 as necessary. Operation 214 may be optionally performed.

In operation 215, the media player 12 configures a playback pipeline for playing the AR service. The pipeline may have, as detailed attributes, at least one of configuration information, such as the transmission path, transmission protocol, transmission port, or quality of service (QoS) to transmit the generation information of the UE 10 to the AS 22 or transmit the generation information of the AS 22 to the UE 10.

Referring to FIG. 2B, in operation 216, the media player 12 establishes a transmission session between media player and AS to transmit/receive information about the components of the AR service and the AS 22.

In operation 217, the media player 12 provides information about the established transmission session(s) to the MSH 13.

In operation 218, the media player 12 transmits the above-described ambient environment information about the UE 10 to the AS 22.

In operation 219, the AS 22 performs the process requested by the UE 10 based on the ambient environment information received from the UE 10 and generates a result. Operations 216, 218, and 219 may be performed by establishing as many transmission sessions as the number of components (e.g., live geometry, user UE position/direction information, image/sensor information) used by the UE 10 and the AS 22. The generated result is generated in the form of media segments and is transmitted to the UE 10 through operations 220 to 223.

Specifically, the media player 12 requests initialization information including media initialization information from the AS in operation 220, receives the initialization information in operation 221, requests the media segment from the AS 22 in operation 222, receives the media segment of the content in operation 223, and then, as in operation 224, the media player 12 repeats operations 218 to 223 of transmitting ambient environment information and requesting and receiving the media segment. As the information about the components of the ASD, an example of components related to the information transmitted by the UE 10 is as follows. The UE 10 needs to shape the ambient environment for proper consumption of the AR service. To that end, the UE 10 obtains information using the camera and/or sensor and analyzes the obtained information and shapes the ambient environment.

In the present disclosure, the shaped ambient environment is referred to as live geometry. The shaping may be performed by the AS 22 following the instruction of the application provider 23 or the UE 10 depending on the capability/performance of the UE 10. When the UE 10 performs shaping, i.e., generates live geometry, the AS 22 following the instruction of the application provider 23 in operation 209 may generate an ASD including transmission path information for receiving the live geometry from the UE 10. The UE 10 performs ASD processing in operation 212 and then establishes a transmission path for transmission of live geometry in operation 216. In operation 218, the UE 10 may transmit live geometry, as part of the UE space information as the ambient environment information, to the AS 22.

In another embodiment, if the AS 22 following the instruction of the application provider 23 performs shaping, i.e., live geometry generation, all or some of the information obtained by the camera and/or sensor of the UE 10 may be transmitted, as part of the UE space information, to the AS 22. The UE space information may include at least one of live geometry information, UE position/direction information, and information obtained by the camera/sensor.

As such, if shaping is performed by the AS 22, not by the UE 10, the UE 10 in operation 206 of FIG. 2 may request the application function 21 to prepare for a process to be executed by the AS 22 and request the result information. The AS 22 may include, in the ASD, the transmission path information for receiving camera/sensor information for receiving as an input to the corresponding process, along with the information about the process requested and accepted upon generating the ASD in operation 209. As in the above-described example, since the position and direction of the UE 10 in the user space may be inferred through analysis of the camera/sensor information while shaping the UE ambient environment by the UE 10 or the application provider 23, the live geometry and position/direction information about the UE 10 may be included in the AS space information (AR scene description) in the AR service description (ASD).

As the components of the ASD, components related to the information transmitted by the AS 22 are as follows. The AS 22 compiles the AR content selected by the UE 10 and the ambient environment information received from the UE 10, constructing the shape of the AR content to be shown on the display of the UE 10. The AS 22 tailors all or some of AR contents or renders the AR contents into 2D images according to the process request received from the UE 10 in operation 206. The processed AR content may be provided to the UE 10, and the processed AR content information and the transmission path information for the UE 10 to receive the AR content may be included in the ASD.

Figure 3:
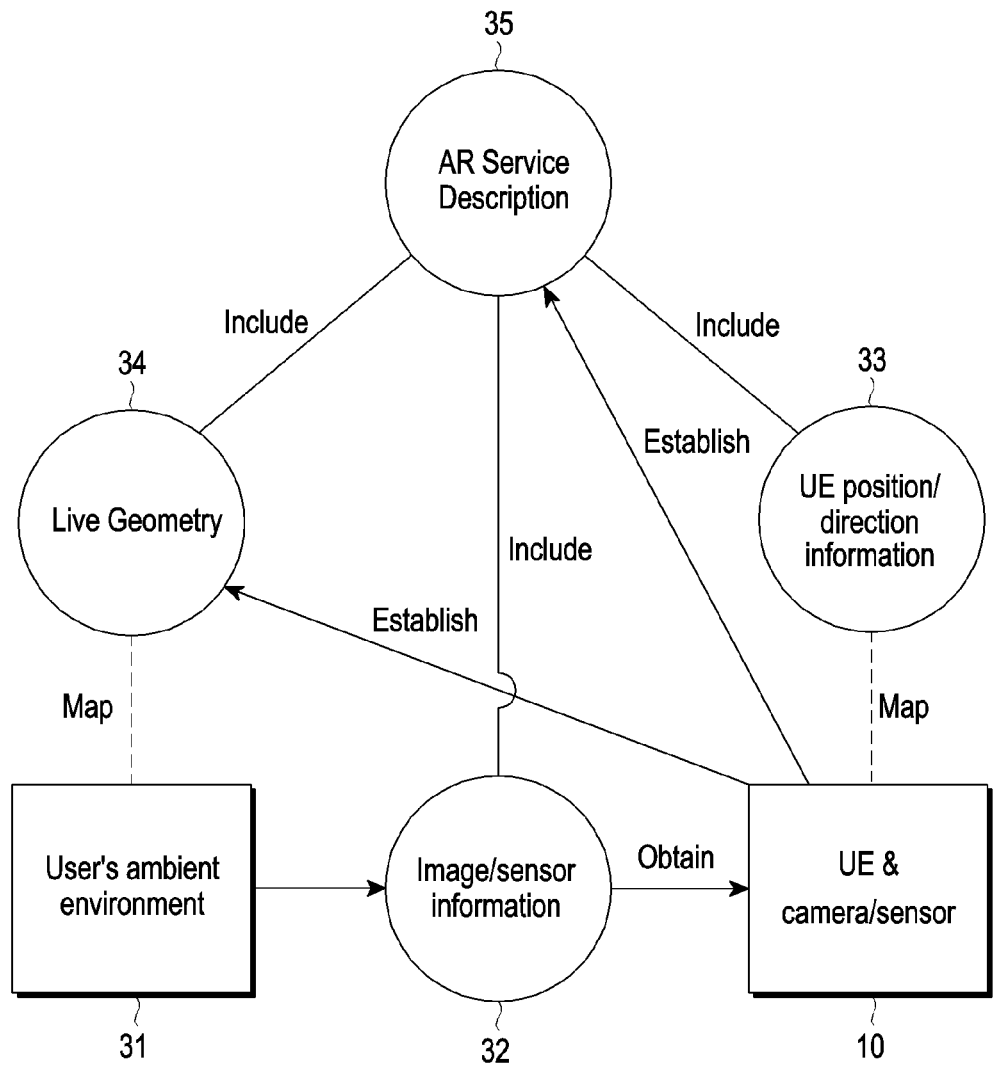
FIG. 3 is a view illustrating mapping between a physical entity and an information entity in a communication system providing an AR service according to an embodiment of the present disclosure.

FIG. 3 is a view illustrating mapping between a physical entity and an information entity in a communication system providing an AR service according to an embodiment of the present disclosure. The rectangular blocks 10 and 31 of FIG. 3 denote the physical entities/environment, and the circular blocks 32, 33, 34, and 35 denote information obtained/generated/transmitted/received in relation to providing the AR service.

Referring to FIG. 3, the UE 10 and the ambient environment 31 of the user (UE) may be represented as components of the AR service for the user (UE). The UE 10 may obtain images or sensor information 32 using a device, e.g., a camera and/or sensor to grasp the ambient environment of the UE and shape the ambient environment, grasped based on the obtained information, into live geometry 34. There is a mapping relationship between the ambient environment and the live geometry in the disclosure. On the AR service, the UE 10 is represented with information 33 about a spatial position and direction, and at least one of the live geometry, position/direction information about the user UE, and image/sensor information may be included, as the component(s) of the AR service, in the ASD 35, and a mapping relationship exists between the UE 10 and user UE position/direction information.

Figure 4:
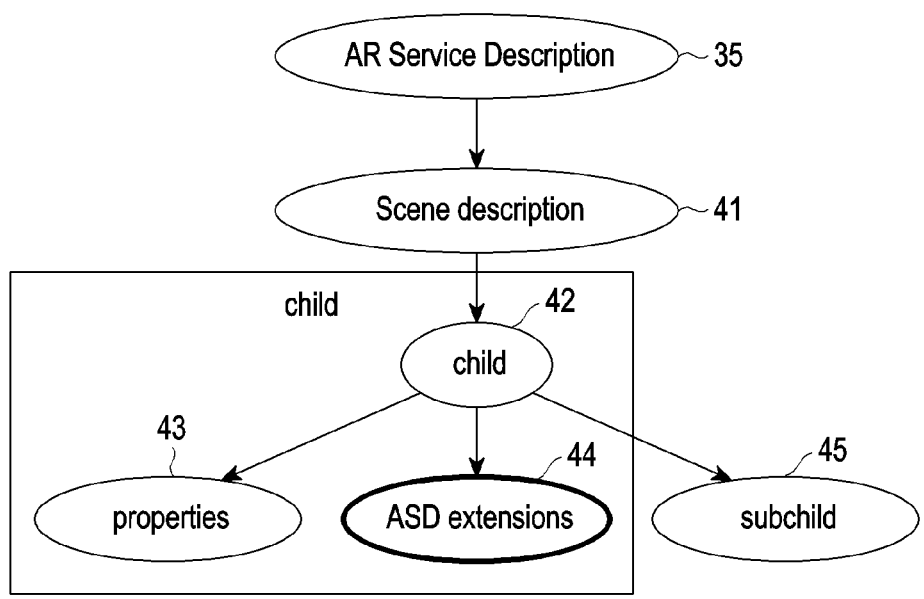
FIG. 4 is a view illustrating an example of an AR service description (ASD) extended from a scene description in an AR service providing method according to an embodiment of the present disclosure.

FIG. 4 is a view illustrating an example of an AR service description (ASD) extended from a scene description in an AR service providing method according to an embodiment of the present disclosure.

Referring to FIG. 4, since the ASD 35 has had the scene description 41, which is information describing, e.g., the content position and direction in the space, extended, the ASD 35 may have the child(ren) 42 which are components provided by the scene description which is the target for extension and may use the attribute information 43 about each child and the subchild 45 which is a sub component of the component, as it is, and the components of the ASD provided herein, as the extensions 44 of the scene description 41, may be extended to have additional attributes of the child 42 of the scene description 41.

Figure 5:
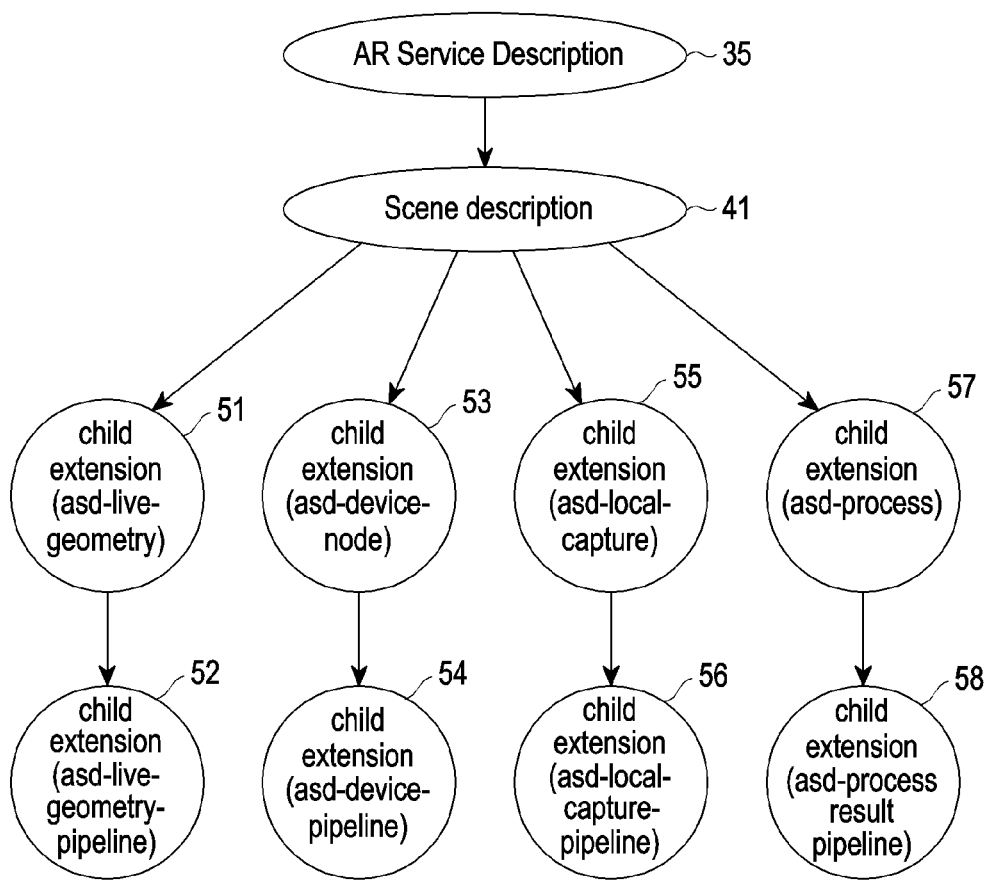
FIG. 5 is a view illustrating an example of a scene description extended for adding component(s) of an ASD in an AR service providing method according to an embodiment of the present disclosure.

FIG. 5 is a view illustrating an example of a scene description extended for adding component(s) of an ASD in an AR service providing method according to an embodiment of the present disclosure.

Referring to FIG. 5, the scene description 41 may be extended to include one or more of the above-described UE ambient shape (asd-live-geometry) 51, live geometry transmission information (asd-live-geometry-pipeline) 52, UE position/direction information (asd-device-node) 53, UE position/direction information transmission information (asd-device-pipeline) 54, camera/sensor acquisition information (asd-local-capture) 55, camera/sensor acquisition information transmission information (asd-local-capture-pipeline) 56, application provider processing information (asd-process) 57, processing result transmission information (asd-process-result-pipeline) 58.

The pipeline indicates a transmission path through which actual information represented by a node is transmitted. By receiving the ASD 35 and pipeline information 52, 54, 56, and 58 in the ASD, the media player 12 may be aware of the transmission path for transmitting, e.g., live geometry, camera/sensor capture, device pose information to the AS 22 and the transmission path of the result which is transmitted as a result of processing on AR content by the AS 22. If there is the child 42 indicating the transmission path information according to the scene description 41, the pipeline may indicate at least one of the address, identifier, or index of the corresponding child. Meanwhile, information corresponding to at least one of the live geometry transmission information (asd-live-geometry-pipeline) 52, UE position/direction information transmission information (asd-device-pipeline) 54, and camera/sensor acquisition information transmission information (asd-local-capture-pipeline) 56 may be included, as the ambient environment information transmitted by the UE 10 to the AS 22 in operation 218 of FIG. 2B, in the UE space information.

Figure 6:
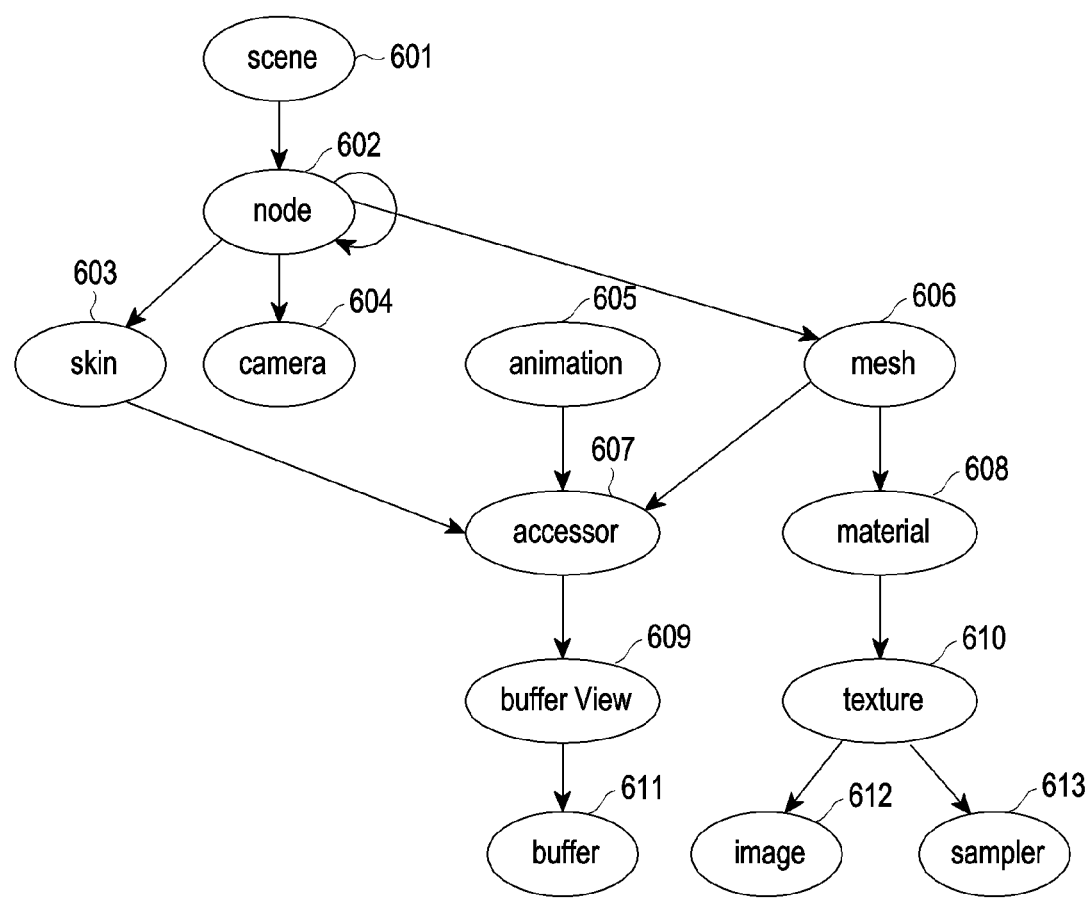
FIG. 6 is a view illustrating an example of a child/subchild structure of gITF which is a scene description in an AR service providing method according to an embodiment of the present disclosure.

FIG. 6 is a view illustrating an example of a child/subchild structure of graphics language transmission format (glTF) which is a scene description in an AR service providing method according to an embodiment of the present disclosure. The glTF is one of scene description file formats representing a 3D scene.

Referring to FIG. 6, in the scene 601, one or more nodes 602 may exist as children of the scene 601. As the children of the node 602, there may be skin 603, which is information about the change ratio of the mesh according to the rotation of the skeleton, camera 604, which is information for rendering the scene, animation 605, which is information about changes over time, and mesh 606 composed of such components as points, lines, planes, etc. The camera 604 has information about the viewport used to render the scene 601, and the mesh 606 contains points, lines, planes, and their sets, surface texture of objects existing in the scene 601 space. In FIG. 6, the animation 605 is not independently existing information, but exists only when the skin 603 or mesh 606 of the node is changed (animated) over time, so that no lead line is shown from the node 602 to the animation 605.

Figure 7:
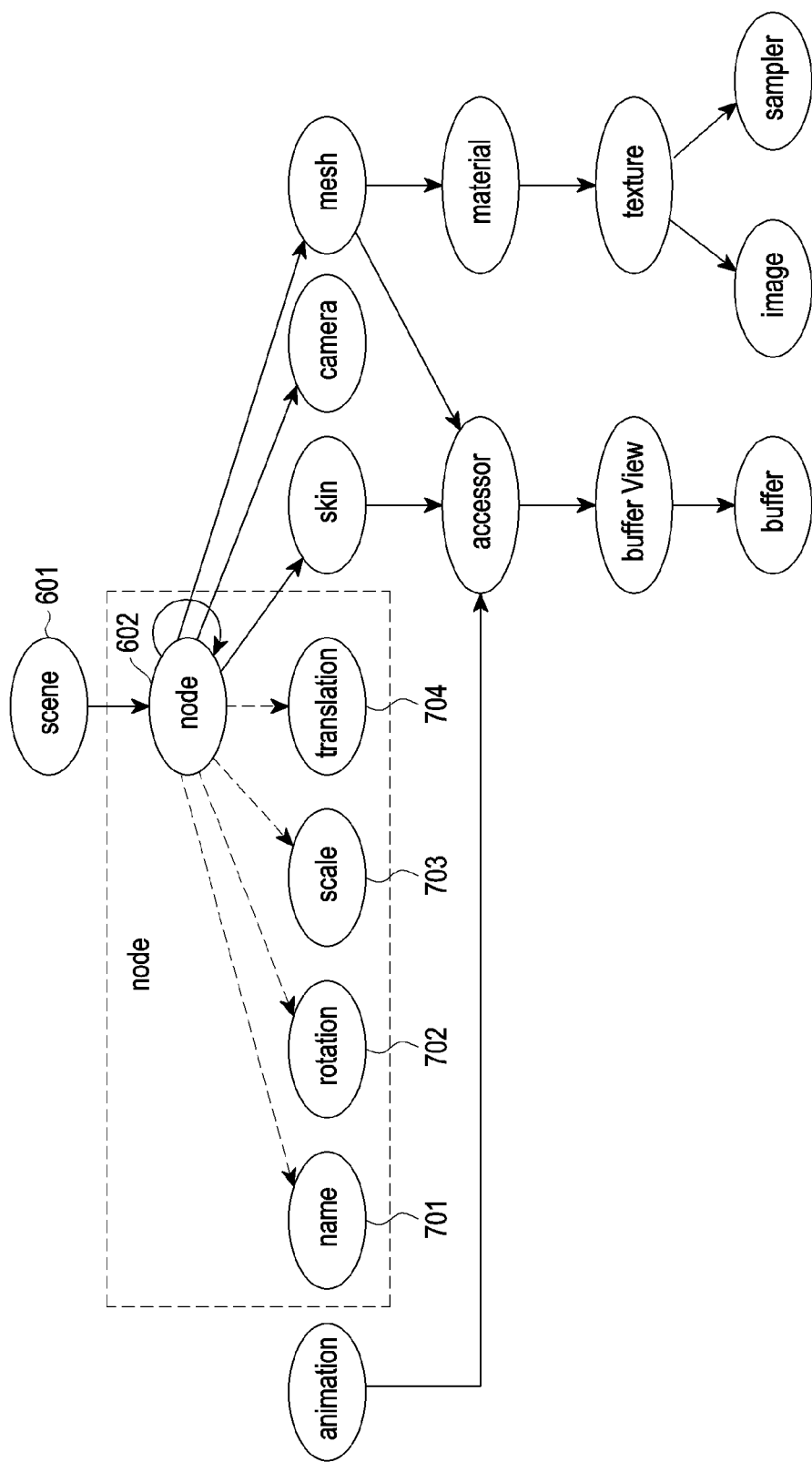
FIGS. 7 and 8 are views illustrating an example of an attribute of a node in an AR service providing method according to an embodiment of the present disclosure.
Figure 8:
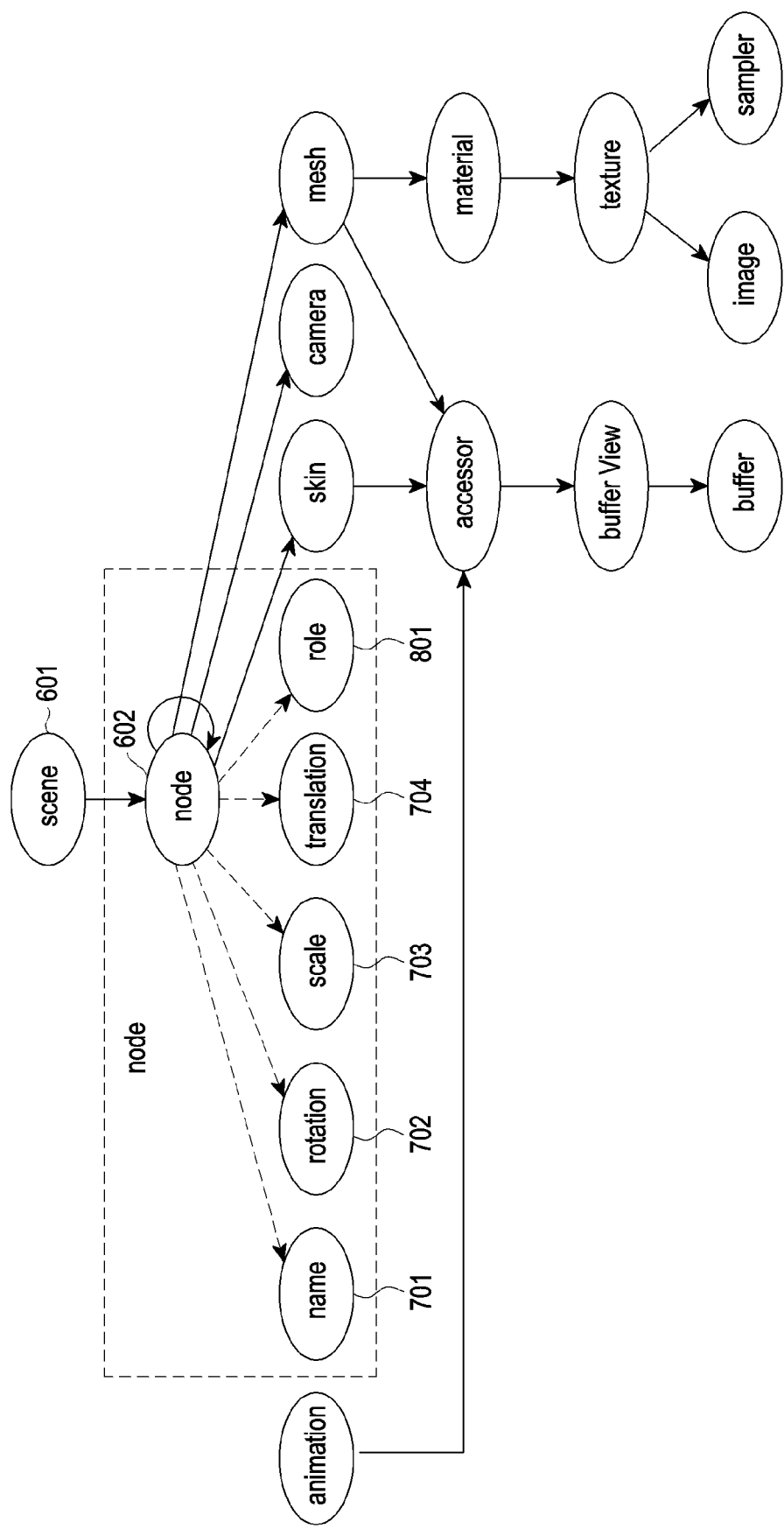

FIGS. 7 and 8 are views illustrating an example of an attribute of a node in an AR service providing method according to an embodiment of the present disclosure.

Specifically, as in the example of FIG. 7, the node 602 of FIG. 6 may include attribute information, such as a name 701 that is an identifier for identifying the node, a rotation 702 that is a rotation matrix, a scale 703 that is a magnification matrix, and a translation 704 that is a movement matrix. In the disclosure, an additional attribute may be added under the child as in the example of FIG. 8 to indicate that a specific child of the scene description is extended as an ASD component. In the example of FIG. 8, additional attribute information, referred to as role 801, is shown in the node 602 that is the child of the scene 601. The attribute value of role attribute 801 indicates one of the ASD components, and if the attribute value is "asd-live-geometry," the attribute value indicates that the node is a live geometry that is an ASD component.

Figure 9:
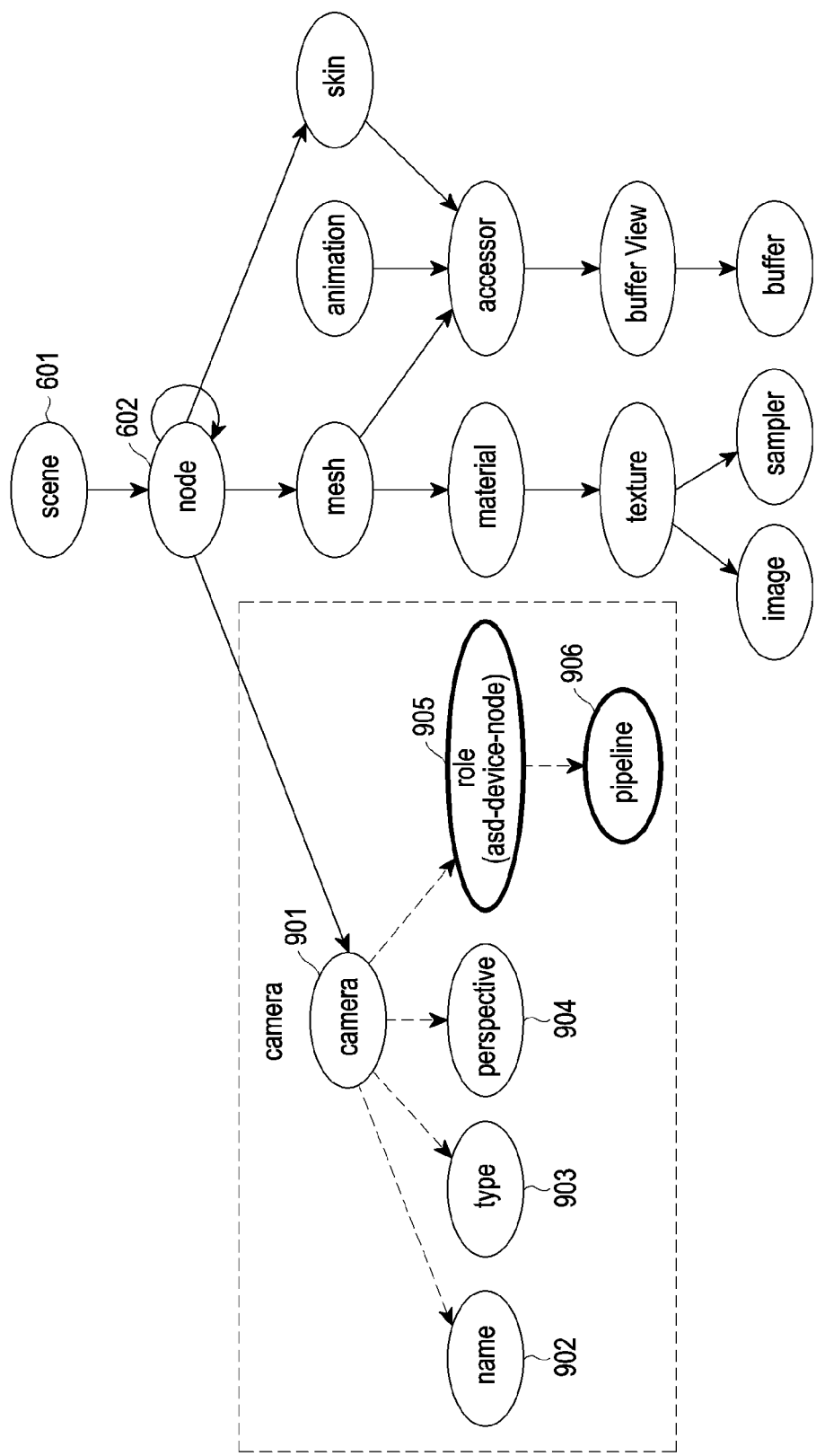
FIG. 9 is a view illustrating an extension example for a camera among children of a node in an AR service providing method according to an embodiment of the present disclosure.

FIG. 9 is a view illustrating an extension example for a camera among children of a node in an AR service providing method according to an embodiment of the present disclosure.

FIG. 9 illustrates an example of extension for the camera 901 among the children of the node 602 of glTF. The camera 901 receives the position and direction information about the node 602, specifies the name 902 and the projection type 903 corresponding to the identifier of the camera 901 and, if the the position and direction information are of a perspective type, specifies attribute information about perspective 904. Since the camera 901 has perspective information for rendering the scene 601, the camera may be used as a specific node indicating the position and direction of the UE 10.

In the present disclosure, the role and attribute value (asd-device-node) 905 is added to the camera 901, indicating that the corresponding camera child corresponds to the position and direction of the UE 10 among the components of the ASD. Since the position and direction information about the camera 901 may be continuously updated when the user moves the UE 10 or even with a tiny head motion with the UE 10 worn (e.g., AR glasses), the position and direction information may be transmitted in a separate transmission path through the pipeline 906. To that end, as an additional attribute of the camera 901 and dependent attribute value of the role 905, the pipeline information 906 is added. The pipeline 906 includes transmission information for transmitting the position/direction information about the UE 10.

As described in connection with operations 209, 211, 216, and 218 of FIGS. 2A and 2B, if the application provider 23 includes the pipeline information in the ASD and transmits the pipeline information to the UE 10, the UE 10 may establish a transmission session and transmit the position/direction information (asd-device-node) separately from other UE information (e.g., asd-live-geometry).

The node 602 of FIG. 8 and the camera 901 of FIG. 9 may be extended to indicate the asd-local-capture among the components of the ASD. Since the UE 10 has a plurality of cameras or depth sensors and their positions do not overlap in the UE 10, according to the local capture information (name, translation/rotation/scale (TRS) information relative to the UE, camera/sensor information, perspective information) transferred by the UE 10 in operations 205 and 206 of FIG. 2A, the application provider 23 has a plurality of camera children in the ASD, and each camera child has the asd-local-capture as the attribute value of the role in the same manner and, in the above-described name, TRS, type, and perspective, the attribute value is mapped to each one of the camera/sensor information transferred from the UE 10. Using the pipeline information provided as a sub attribute, the UE 10 establishes a transmission session in operation 216 of FIG. 2B and, in operation 218, transmits camera/ sensor information (asd-local-capture) separately from the other UE information (e.g., asd-device-node).

Figure 10:
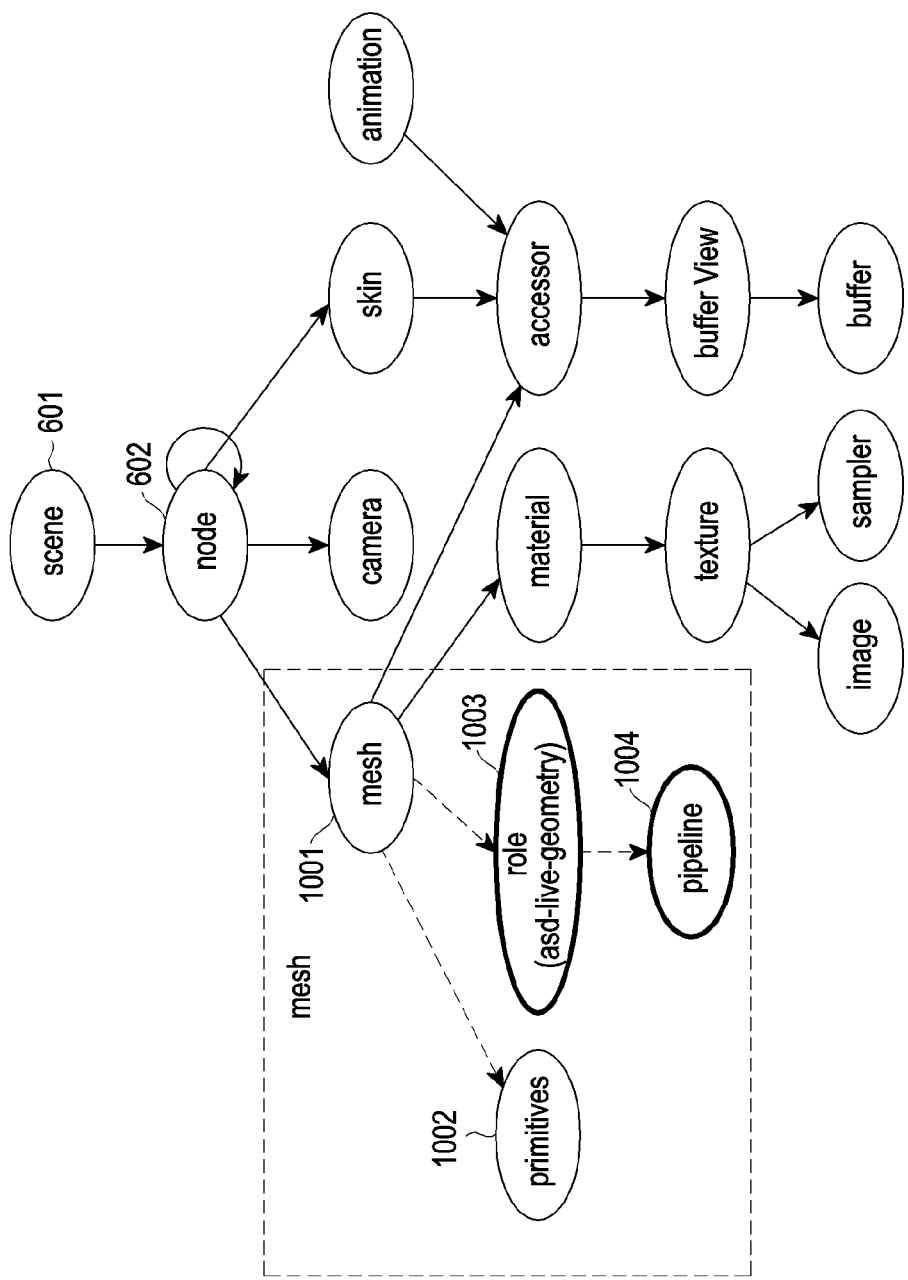
FIG. 10 is a view illustrating an extension example for a mesh among children of a node in an AR service providing method according to an embodiment of the present disclosure.

FIG. 10 is a view illustrating an extension example for a mesh among children of a node in an AR service providing method according to an embodiment of the present disclosure.

FIG. 10 illustrates an example of extension for the mesh 1001 among the children of the node 602 of glTF. The mesh 1001 has information, such as points, lines, planes, their sets, and surface textures in space as primitives information 1002 which is configuration information about the mesh 1001. Among the ASD components, live geometry may be represented as the user's (UE's) ambient environment with points, lines, planes and texture information, so that the attribute (role) and attribute value (asd-live-geometry) 1003 may be added and displayed so that one of the meshes plays a role as live geometry. As an example, assuming that one mesh 1001 is composed of 100 points and 50 lines, the primitive 1002 becomes two points and lines and, as the sub child of each primitive 1002, information about each of 100 points or 50 lines may be included.

Since the live geometry may be continuously updated, based on the newly obtained image/sensor value, when the user moves the UE 10 or even with a tiny head motion with the UE 10 worn (e.g., AR glasses), the position and direction information may be transmitted in a separate transmission path through the pipeline 1004. To that end, as an additional attribute of the mesh 1001 and dependent attribute value of the role 1003, the pipeline information 1004 is added. The pipeline 1004 includes transmission information for transmitting the live geometry. If the AS 22 includes the pipeline information in the ASD in operation 209 of FIG. 2A and transmits the pipeline information to the UE 10 in operation 211, the UE 10 may establish a transmission session with the AS 22 in operation 216 and transmit the live geometry (asd-live-geometry) separately from other UE information (e.g., asd-device) in operation 218.

The node 602 of FIG. 8 and the mesh 1001 of FIG. 10 may be extended to indicate the asd-process among the components of the ASD. According to a request of the UE 10, the application provider 23 allows the AS 22 to perform tailoring on all of the AR contents or some of 3D contents, 2D image rendering, and semantic analysis process on local capture. The processing result is transmitted from the AS 22 to the UE 10, and transmission path information for receiving the same is provided to the pipeline 1004.

Figure 11:
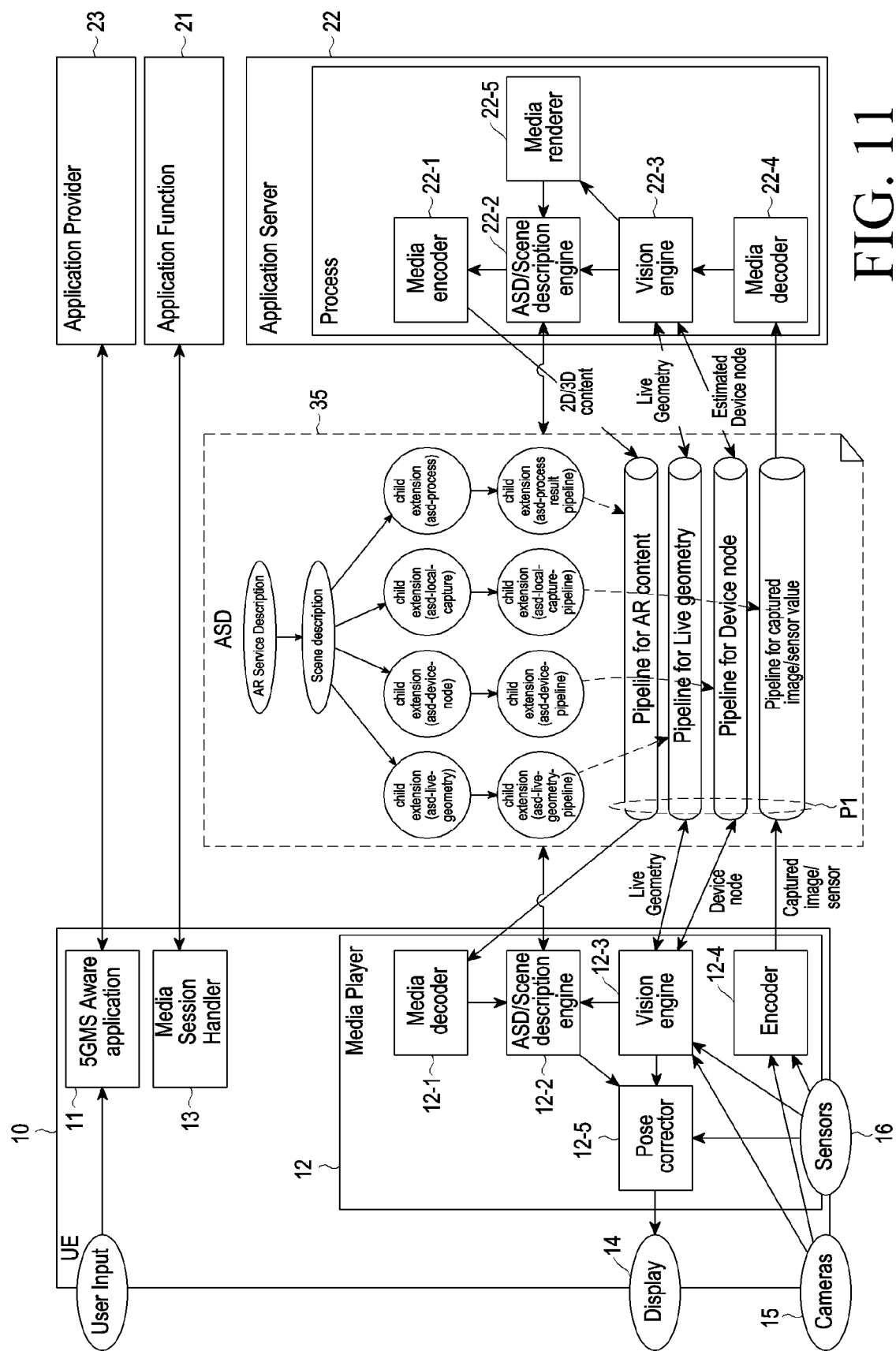
FIG. 11 is a view illustrating an example of a configuration of a communication system providing an AR service according to an embodiment of the present disclosure.

FIG. 11 is a view illustrating an example of a configuration of a communication system providing an AR service according to an embodiment of the present disclosure.

Referring to FIG. 11, the UE 10 includes a 5GMS aware application 11, a media player 12, an MSH 13, a display 14, a camera 15, and a sensor 15 as described in connection with the embodiment of FIGS. 2A and 2B. The media player 12 includes a media decoder 12-1 for decoding media data, an ASD/scene description engine 12-2, a vision engine 12-3, an encoder 12-4 for encoding media data, and a pose corrector 12-5 for adjusting the projection position of the media received according to the final position/direction of the UE. Although FIG. 11 illustrates the components of the UE 10 as functional blocks for convenience of description, the 5GMS aware application 11, the media player 12, and the MSH 13 may be implemented in software (or software/hardware combination) programmed to perform the operations of the UE 10 described in connection with the embodiment of FIGS. 2A and 2B and, although not shown, the UE 10 may be implemented to include at least one processor controlling the operations of the UE 10 according to each of the embodiments of the disclosure and a combination of at least one embodiment, a transceiver transmitting/receiving signals through a network, and a memory having the software installed thereon.

Further, in FIG. 11, the AS 22 includes a media encoder 22-1, an ASD/scene description engine 22-2, a vision engine 22-3, a media decoder 22-4, and a media renderer 22-5 for rendering media data, to perform the operations described in connection with the embodiment of FIGS. 2A and 2B. Although FIG. 11 illustrates the components of the AS 22 as functional blocks for convenience of description, the AS 22 may be implemented to include at least one processor controlling the operations of a server based on software (or a combination of software/hardware) programmed to perform the operations of the AS 22 described in connection with the embodiment of FIGS. 2A and 2B, a transceiver (or communication interface) transmitting/receiving signals through a network, and a memory having the software installed thereon.

In FIG. 11, the description of the embodiments including the UE 10 and the AS 22 and the components included in the UE 10 and the AS 22 is identical to the description of the embodiment of FIGS. 2A and 2B and the description made below in connection with FIG. 11.

Referring to FIG. 11, the operation in which the UE 10 and the application server (AS) 22 and the process of the AS 22 provide an AR service via the ASD 35 and the pipeline P1 is described. It is omitted from the illustration of FIG. 11 under the assumption that according to a user input 1101, the 5GMS aware application 11 is executed and, for convenience, all other function modules in the UE and the physical devices (camera/display/sensor) are present inside or outside the media player 12 and all are connected. What are indicated by the arrows of FIG. 11 means transmission of data/information but do not necessarily mean that there are no other transmissions/connections in other directions than the connections shown.

The 5GMS aware application 11 of the UE 10 instructs the media player 12 to perform the above-described AR registration. The vision engine 12-3 in the media player 12 receives an input from the camera 15 and the sensor 16 and establishes live geometry. If the 5GMS aware application 11 selects an AR content, the UE 10 generates UE performance information, e.g., whether live geometry may be generated or whether the AS 22 is requested to perform process without generating live geometry, device information about the UE 10, e.g., the number of cameras 15 and the type of each camera, the number of sensors 16 and the type and identifier of each, and such information, and transfers the information to the MSH 10, and the transferred information is transferred from the MSH 13 to the AF 21.

If the 5GMS aware application 11 instructs to play, the media player 12 establishes an ASD transmission path with the AS 22 based on the ASD path information received from the AF 21. The process of the ASD/scene description engine 22-2 of the AS 22 generates an ASD, and the generated ASD 35 includes a scene description for the AR service, the above-described ASD components of the disclosure, and the pipeline information P1 which is the transmission path for transmitting/receiving the components. The ASD/scene description engine 12-2 of the UE 10 requests the ASD 35 from the ASD/scene description engine 22-2 of the AS 22, and the UE 10 receives the first ASD from the AS 22.

The ASD 35 may include the captured image/sensor child and pipeline depending on the process type/information requested by the UE 10 and, if not included, the UE 10 performs pipeline establishment and transmission session establishment as described in connection with the example of FIGS. 2A and 2B, and the image/sensor information encoded by the encoder 12-1 of the UE 10 is transferred to the media decoder 22-1 of the AS 22. The media decoder 22-4 of the AS 22 transfers the decoded information to the vision engine 22-3, and the vision engine 22-3 establishes live geometry and the predicted position/direction information about the UE 10 based on the received information. The live geometry generated by the AS 22 and the predicted position/direction information about the UE 10 are downlink-streamed from the AS 22 to the UE 10 through the pipeline P1.

If the UE 10 establishes position/direction information about the UE 10 and the live geometry using the vision engine 12-3, the ASD 35 includes uplink pipeline information about the device node and the live geometry, and the live geometry generated by the UE 10 and the position/direction information about the UE 10 are uplink-streamed from the UE 10 to the AS 22 through the pipeline 35. The live geometry and the position/direction information about the UE 10 may be generated only by either the UE 10 or the AS 22 or may be generated by each of the UE 10 and the AS 22 and exchanged with each other. When the AS 22 generates the live geometry and the position/direction information about the UE 10, more accurate information may be generated through advanced processing.

It may be understood that the UE position/direction information transmitted from the AS 22 to the UE 10 in FIG. 11 is estimated/predicted UE position/direction information (estimated device node), and the UE position/direction information received by the AS 22 from the UE 10 through the pipeline is the UE position/direction information (device node) obtained by the UE 10.

The AR content provided from the AS 22 to the UE 10 may be all or some of 3D contents or 2D contents depending on the processing requirements of the UE 10. If the 2D content is requested, the AS 22 may perform 2D rendering on the 3D content in the media renderer 22-5 of the AS 22 in the form of being required to be played on the display 14 of the UE 10 based on the predicted position/direction of the UE 10 or the received UE position/direction, encode the AR content through the media encoder 22-1, and transmits the AR content from the AS 22 to the media player 12 of the UE 10. The UE 10 processes the received image using the ASD/scene description engine 12-2 and pose corrector 12-5, and the processed image is output through the display 14.

Figure 12:
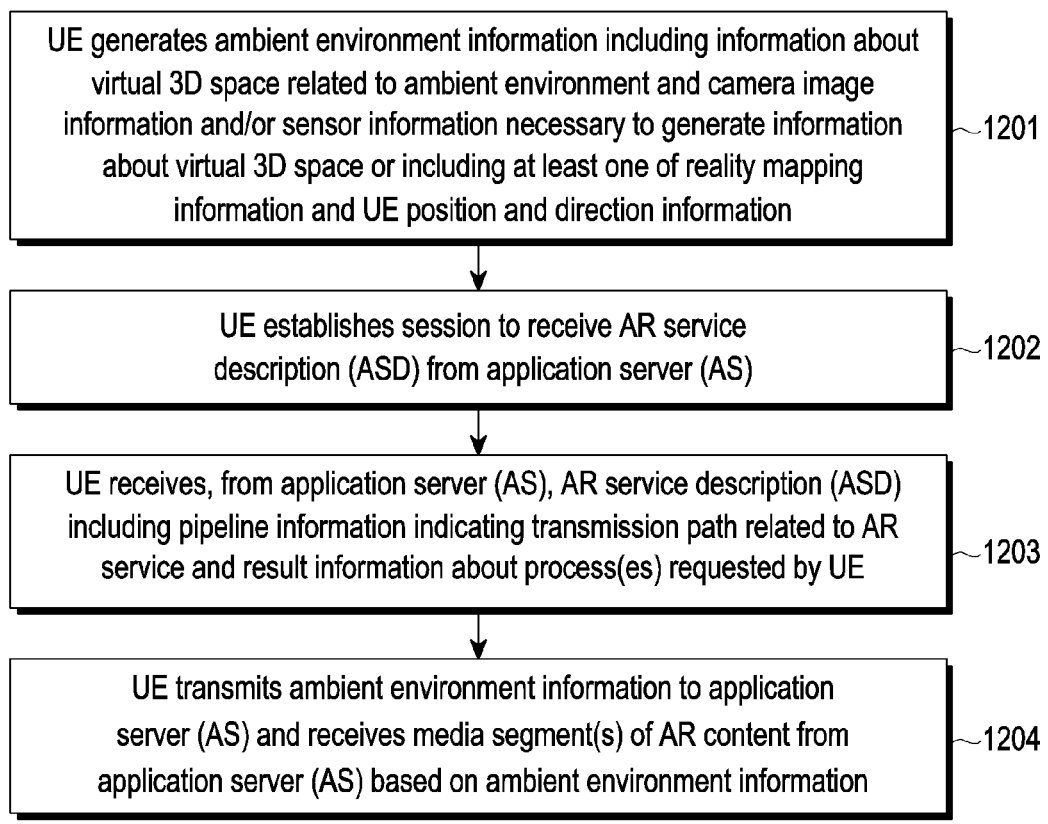
FIG. 12 is a view illustrating an example of a method performed by a UE in an AR service providing method according to an embodiment of the present disclosure.

FIG. 12 is a view illustrating an example of a method performed by a UE in an AR service providing method according to an embodiment of the present disclosure.

Referring to FIG. 12, in operation 1201, the UE 10 generates/obtains ambient environment information including information about a virtual 3D space related to the ambient environment, mapping information with the reality and camera image information and/or sensor information including at least one of position and direction information about the UE 10 or necessary to generate information about the virtual 3D space. Thereafter, in operation 1202, the UE 10 establishes a session to receive the ASD from the application server (AS) 22.

In operation 1203, the UE 10 receives the ASD including the result information about the above-described process(es) requested by the UE 10 and the pipeline information indicating the transmission path related to the AR service from the application server (AS) 22. Thereafter, in operation 1204, the UE 10 receives the ambient environment information to the application server (AS) 22 and receives media segment(s) of AR content from the application server (AS) 22 based on the ambient environment information. Operation 1204 may be repeatedly performed.

Figure 13:
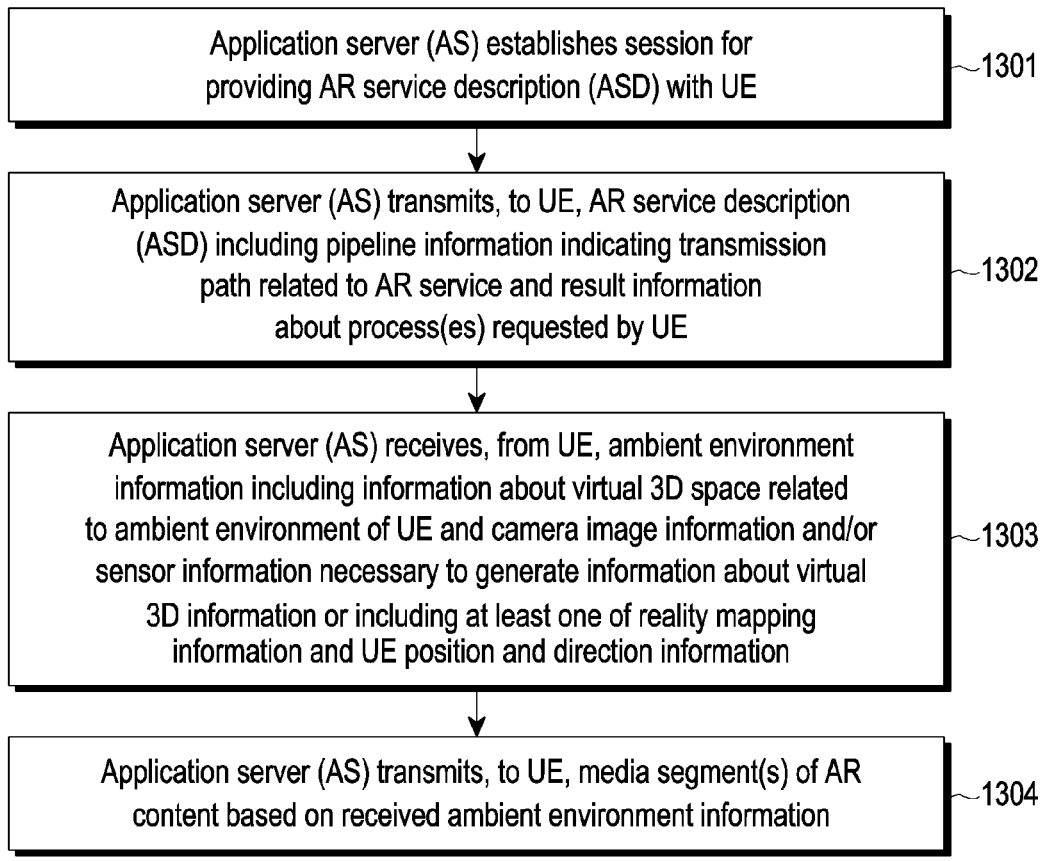
FIG. 13 is a view illustrating an example of a method performed by an AS in an AR service providing method according to an embodiment of the present disclosure.

FIG. 13 is a view illustrating an example method performed by an AS in an AR service providing method according to an embodiment of the present disclosure. Referring to FIG. 13, in operation 1301, the AS 22 establishes a session for providing the ASD. In operation 1302, the AS 22 transmits, to the UE 10, the ASD including the result information about the above-described process(es) requested by the UE 10 and the pipeline information indicating the transmission path related to the AR service. In operation 1303, the AS 22 receives, from the UE 10, ambient environment information including information about a virtual 3D space related to the ambient environment, mapping information with the reality and camera image information and/or sensor information including at least one of position and direction information about the UE or necessary to generate information about the virtual 3D space. In operation 1304, the AS 22 transmits media segment(s) of AR content to the UE 10 based on the received ambient environment information. Operation 1304 may be repeatedly performed.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments provided. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

In the drawings illustrating methods according to embodiments, the order of description is not necessarily identical to the order of execution, and some operations may be performed in a different order or simultaneously.

Some of the components shown in the drawings illustrating methods according to embodiments may be omitted in such an extent as not to impair the gist or essence of the disclosure.

The methods in the disclosure may be performed in a combination of all or some of the embodiments described herein in such an extent as not to impair the gist or essence of the disclosure.

Various embodiments of the disclosure have been described above. The foregoing description of the disclosure is merely an example, and embodiments of the disclosure are not limited thereto. It will be appreciated by one of ordinary skill in the art that the present disclosure may be implemented in other various specific forms without changing the essence or technical spirit of the present disclosure. It should be noted that the scope of the present disclosure is defined by the appended claims rather than the described description of the embodiments and include all modifications or changes made to the claims or equivalents of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for an augmented reality (AR) service in a communication system, the method comprising:
   identifying, based on a capability of the UE or an instruction of an application provider in the communication system, whether the UE or an application server generates information on live geometry corresponding to a virtual three-dimension (3D) space in which the UE is positioned;
   generating ambient environment information including at least one piece of information obtained based on an ambient environment of the UE;
   establishing a session for receiving an AR service description from the application server;
   receiving, from the application server, the AR service description including pipeline information indicating a transmission path related to the AR service and result information for at least one process requested by the UE; and
   transmitting, to the application server, the ambient environment information and receiving, from the application server, at least one media segment of an AR content based on the ambient environment information,
   wherein the ambient environment information includes the information on the live geometry in case that the UE generate the information on the live geometry, and
   wherein the AR service description includes the information on the live geometry in case that the application server generates the information on the live geometry.

2. The method of claim 1, wherein the ambient environment information includes at least one of camera image information or sensor information to generate the information on the live geometry related to the ambient environment of the UE.

3. The method of claim 1, wherein the AR service description includes at least one of a transmission pipeline of rendering result information and result information for a two-dimension (2D) rendering process of a 3D AR content and a related process and establishment of a transmission session, or a transmission of result information for processes.

4. The method of claim 3, wherein:
   the AR service description includes an extended scene description; and
   the extended scene description includes at least one of a shape around the UE, live geometry transmission information, UE position and direction information, transmission information for the UE position and direction information, camera and sensor acquisition information, transmission information for the camera and sensor acquisition information, processing information for an application provider, or transmission information for the processing information.

5. The method of claim 1, wherein identifying which of the UE or an application server generates information on live geometry comprises identifying that both of the UE and the application server generate the information on the live geometry.

6. A user equipment (UE) for an augmented reality (AR) service in a communication system, the UE comprising:
   a transceiver;
   memory configured to store information related to the AR service; and
   at least one processor operably coupled to the transceiver and the memory, the at least one processor configured to:
      identify, based on a capability of the UE or an instruction of an application provider in the communication system, whether the UE or an application server generates information on live geometry corresponding to a virtual three-dimension (3D) space in which the UE is positioned,
      generate ambient environment information including at least one piece of information obtained based on an ambient environment of the UE,
      establish a session for receiving an AR service description from the application server,
      receive, from the application server through the transceiver, the AR service description including pipeline information indicating a transmission path related to the AR service and result information for at least one process requested by the UE, and
      transmit, to the application server, the ambient environment information and receive, from the application server, at least one media segment of an AR content based on the ambient environment information,
   wherein the ambient environment information includes the information on the live geometry in case that the UE generate the information on the live geometry, and
   wherein the AR service description includes the information on the live geometry in case that the application server generates the information on the live geometry.

7. The UE of claim 6, wherein the ambient environment information includes at least one of camera image information or sensor information to generate the information on the live geometry related to the ambient environment of the UE.

8. The UE of claim 6, wherein the AR service description includes at least one of a transmission pipeline of rendering result information and result information for a two-dimension (2D) rendering process of a 3D AR content and a related process and establishment of a transmission session, or a transmission of result information for processes.

9. The UE of claim 8, wherein:
the AR service description includes an extended scene description; and
the extended scene description includes at least one of a shape around the UE, live geometry transmission information, UE position and direction information, transmission information for the UE position and direction information, camera and sensor acquisition information, transmission information for the camera and sensor acquisition information, processing information for an application provider, or transmission information for the processing information.

10. The UE of claim 6, wherein the at least one processor is further configured to identify that both of the UE and the application server generate the information on the live geometry.

11. A method performed by an application server for an augmented reality (AR) service in a communication system, the method comprising:
identifying, based on a capability of a user equipment (UE) or an instruction of an application provider in the communication system, whether the application server or the UE generates information on live geometry corresponding to a virtual three-dimension (3D) space in which the UE is positioned;
establishing a session with the UE for providing an AR service description;
transmitting, to the UE, the AR service description including pipeline information indicating a transmission path related to the AR service and result information for at least one process requested by the UE; and
receiving, from the UE, ambient environment information and transmitting, to the UE, at least one media segment of an AR content based on the ambient environment information,
wherein the ambient environment information includes the information on the live geometry in case that the UE generate the information on the live geometry, and
wherein the AR service description includes the information on the live geometry in case that the application server generates the information on the live geometry.

12. The method of claim 11, wherein the ambient environment information includes at least one of camera image information or sensor information to generate the information on the live geometry related to ambient environment of the UE.

13. The method of claim 11, wherein the AR service description includes at least one of a transmission pipeline of rendering result information and result information about a two-dimension (2D) rendering process of a 3D AR content and a related process and establishment of a transmission session, or a transmission of result information for processes.

14. The method of claim 13, wherein:
the AR service description includes an extended scene description; and
the extended scene description includes at least one of a shape around the UE, live geometry transmission information, UE position and direction information, transmission information for the UE position and direction information, camera and sensor acquisition information, transmission information for the camera and sensor acquisition information, processing information for an application provider, or a transmission information for the processing information.

15. The method of claim 11, wherein identifying which of the application server or a UE generates information on live geometry comprises identifying that both of the application server and the UE generate the information on the live geometry.

16. An application server for an augmented reality (AR) service in a communication system, the application server comprising:
a transceiver;
memory configured to store information related to the AR service; and
at least one processor operably coupled to the transceiver and the memory, the at least one processor configured to:
identify, based on a capability of a user equipment (UE) or an instruction of an application provider in the communication system, whether the application server or the UE generates information on live geometry corresponding to a virtual three-dimension (3D) space in which the UE is positioned,
establish a session with a user equipment (UE) for providing an AR service description,
transmit, to the UE, the AR service description including pipeline information indicating a transmission path related to the AR service and result information for at least one process requested by the UE, and
receive, from the UE, ambient environment information and transmit, to the UE, at least one media segment of an AR content based on the ambient environment information,
wherein the ambient environment information includes the information on the live geometry in case that the UE generate the information on the live geometry, and
wherein the AR service description includes the information on the live geometry in case that the application server generates the information on the live geometry.

17. The application server of claim 16, wherein the ambient environment information includes at least one of camera image information or sensor information to generate the information on the live geometry related to ambient environment of the UE.

18. The application server of claim 16, wherein the AR service description includes at least one of a transmission pipeline of rendering result information and result information about a two-dimension (2D) rendering process of a 3D AR content and a related process and establishment of a transmission session, or a transmission of result information for processes.

19. The application server of claim 18, wherein:
the AR service description includes an extended scene description; and
the extended scene description includes at least one of a shape around the UE, live geometry transmission information, UE position and direction information, transmission information for the UE position and direction information, camera and sensor acquisition information, transmission information for the camera and sensor acquisition information, processing information about an application provider, or a transmission information about the processing information.

20. The application server of claim 16, wherein the at least one processor is further configured to identify that both of the application server and the UE generate the information on the live geometry.

* * * * *